United States Patent
Rueckriem

(10) Patent No.: US 8,081,608 B2
(45) Date of Patent: Dec. 20, 2011

(54) DATA FLOW CONTROL IN WLAN RADIO CONNECTIONS FOR THE IMPAIRMENT OF INTERNET TELEPHONY

(75) Inventor: Reinhard Rueckriem, München (DE)

(73) Assignee: Infineon Technologies AG, Neubiberg (DE)

( * ) Notice: Subject to any disclaimer, the term of this patent is extended or adjusted under 35 U.S.C. 154(b) by 902 days.

(21) Appl. No.: 11/530,631

(22) Filed: Sep. 11, 2006

(65) Prior Publication Data

US 2007/0086402 A1 Apr. 19, 2007

Related U.S. Application Data

(63) Continuation of application No. PCT/DE2005/000249, filed on Feb. 14, 2005.

(30) Foreign Application Priority Data

Mar. 11, 2004 (DE) .................. 10 2004 012 036

(51) Int. Cl.
| | |
|---|---|
| H04W 4/00 | (2009.01) |
| H04L 12/66 | (2006.01) |
| H04L 12/28 | (2006.01) |
| H04J 3/16 | (2006.01) |
| G06F 15/173 | (2006.01) |
| G06F 15/16 | (2006.01) |
| H04N 5/00 | (2011.01) |

(52) U.S. Cl. ... 370/338; 370/352; 370/469; 370/395.64; 709/249; 709/228; 348/615

(58) Field of Classification Search .................. 370/338, 370/469, 352, 395.64

See application file for complete search history.

(56) References Cited

U.S. PATENT DOCUMENTS

| | | | | |
|---|---|---|---|---|
| 5,696,903 | A | * 12/1997 | Mahany | 709/228 |
| 6,466,273 | B1 | * 10/2002 | Dosho et al. | 348/615 |
| 6,567,409 | B1 | * 5/2003 | Tozaki et al. | 370/395.64 |
| 2002/0099854 | A1 | * 7/2002 | Jorgensen | 709/249 |
| 2004/0090989 | A1 | * 5/2004 | Kobayashi | 370/469 |
| 2004/0095914 | A1 | * 5/2004 | Katsube et al. | 370/338 |
| 2004/0213203 | A1 | * 10/2004 | Lucioni | 370/352 |

FOREIGN PATENT DOCUMENTS

| | | |
|---|---|---|
| WO | 03043267 A1 | 5/2003 |
| WO | 03107593 A1 | 12/2003 |
| WO | 2005088907 A1 | 9/2005 |

OTHER PUBLICATIONS

Series G: Transmission Systems and Media, Digital Systems and Networks. International Telephone Connections and Circuits-General Recommendations on the Transmission Quality for an entire Telephone Connection, ITU-T Recommendation G.114, Geneva, pp. 1-13, 2003.

Yu et al., Enhancement of VoIP Over IEEE 802.11 WLAN via Dual Queue Strategy, Communications Society, 2004 IEEE International Conference on Paris, France, Piscataway,NJ, U.S.A., IEEE,, vol. 6, pp. 3706-3711, 2004.

International Search Report with Written Opinion, PCT/DE2005/000249, 7 pages, Mailed on Jun. 7, 2005.

* cited by examiner

Primary Examiner — Dwayne Bost
Assistant Examiner — Timothy Pham
(74) Attorney, Agent, or Firm — Dicke, Billig & Czaja, PLLC

(57) ABSTRACT

In a method for controlling the data flow on a radio link between a WLAN base station and a WLAN mobile station, the data rate on the radio link is reduced for in each case one time period (36, 37) at time intervals (35). One preferred field of application for the method is to restrict general or unauthorized transmission of a telephone call via the Internet.

15 Claims, 2 Drawing Sheets

DATA FLOW CONTROL IN WLAN RADIO CONNECTIONS FOR THE IMPAIRMENT OF INTERNET TELEPHONY

CROSS-REFERENCE TO RELATED APPLICATION

This application is a continuation of co-pending International Application No. PCT/DE2005/000249 filed Feb. 14, 2005 which designates the United States, and claims priority to German application number DE 10 2004 012 036.6 filed Mar. 11, 2004.

TECHNICAL FIELD

The invention relates to a method and an apparatus for controlling the data flow on WLAN radio links, as claimed in the independent patent claims.

BACKGROUND

Mobile speech communication is handled mainly via cell-based mobile radio networks. In Europe, cell-based mobile radio networks such as these are based on the GSM standard or the UMTS standard. The use of these mobile radio networks is costly for the user, with charges being incurred on the basis of the call duration.

The main field of application of wireless local area networks, also referred to as WLANs, is, in contrast to this, non-speech-oriented data transmission. In this case, WLAN forms a generic term for a large number of different standards for local wireless networks. These include in particular the various standards from the IEEE-802.11 Working Group (for example IEEE-802.11b or IEEE-802.11e), the Bluetooth Standard, the HomeRF Standard and the HiperLAN Standard.

So-called hot spots are being installed at public locations owing to the increasingly widespread use of WLANs such as these, in particular to the IEEE-802.11b standard. A so-called hot spot is produced within radio range around an IEEE-802.11-compatible WLAN base station, also referred to as a WLAN access point, in which case, a radio link can be set up within the hot spot between a WLAN-compatible mobile appliance, for example a laptop with a WLAN radio network card, and the WLAN access point. The WLAN access point is also connected to the landline network, for example via a wire-based Ethernet interface. The Internet can be accessed via this wire-based interface. Thus, when within radio range of the WLAN access point, the user of a WLAN-compatible mobile appliance can thus access the Internet via the WLAN access point. In some cases, the use of this infrastructure costs nothing, or is billed on the basis of the amount of data, the access duration or on a flat-rate basis.

Internet telephony, also referred to as VoIP (Voice over Internet Protocol) can be operated via a WLAN access point by access to the Internet. In this case, the speech information is interchanged via the Internet on a packet-oriented basis. VoIP places a number of requirements on the transmission channel, that is to say both on the radio link between the WLAN base station and the WLAN access point and on the wire-based link between the WLAN access point and the communication partner. These requirements and the compliance with these requirements are also referred to as Quality of Service (QoS). One particular requirement in this case is that it is possible to guarantee a data rate which is adequate for transmission of the speech information. A further requirement is for the delay time on the transmission channel to remain constant in time, so that the transmitted signal has little time jitter. As a further essential requirement for the transmission channel, it is necessary to ensure that the delay time on the channel remains below a threshold which is still acceptable for speech communication. In this case, in particular, it is necessary to take account of the fact that the bidirectional delay time, which is normally also referred to as the "round trip delay" (RTD), between the transmission of an information item via the transmission channel and the reception of an information item based on the transmitted information should at most be in the range of less than 100 ms.

If the transmission channel does not satisfy the abovementioned requirements, then a VoIP application is associated with major quality restrictions. If the requirements of the transmission channel can be complied with, it is possible to replace speech communication via a cell-based mobile radio network by VoIP. Speech communication in the radio area of a WLAN access point can in this case be carried out at considerably less cost, or even without any cost, via WLAN instead of via a cell-based mobile radio network. This results in a competition situation between IEEE-802.11-based WLAN radio networks and the cell-based mobile radio network. Since the operators of cell-based mobile radio networks also operate WLAN hot spots, this competition situation even occurs operator-internally. Owing to the cost advantage of a VoIP call over an IEEE-802.11-based WLAN radio link in comparison to a call via a GSM or UMTS mobile radio appliance, there is a risk of the turnover for cell-based mobile radio being reduced.

The IEEE-802.11e Standard, which has not yet been finally specified, will provide novel access methods which allow an improved QoS, in particular for VoIP applications, by appropriate prioritization of the data traffic. In this case, it will be possible for the improved QoS to be made available only to appropriately authorized users, in order to limit the VoIP traffic. Since, however, the improved QoS is not absolutely essential for VoIP applications when the load level on the WLAN access point is at a low or medium level, the VoIP traffic cannot be restricted or monitored by selective provision of an improved QoS.

In principle, the WLAN access point cannot tell whether the data traffic on a radio link between a WLAN mobile station and a WLAN access point is governed by VoIP-based data or non-speech-based data. It is therefore not possible for the WLAN access point to block the WLAN radio link for unauthorized VoIP-based data.

SUMMARY

A synchronous data traffic, in particular by means of VoIP-based data, between a WLAN base station and a WLAN mobile station can be impaired or restricted. In this case, the method is not intended to impede the asynchronous data traffic, for example by means of conventional Internet applications such as surfing on the WWW and e-mail, from the point of view of the user of the WLAN mobile station. In one embodiment, a method for controlling the data flow on a radio link between a WLAN base station and a WLAN mobile station, comprises the step of reducing the data rate on the radio link for in each case one time period at time intervals.

BRIEF DESCRIPTION OF THE DRAWINGS

The invention will be explained in more detail in the following text using one exemplary embodiment and with reference to the figures, in which.

DETAILED DESCRIPTION

Figure 1:
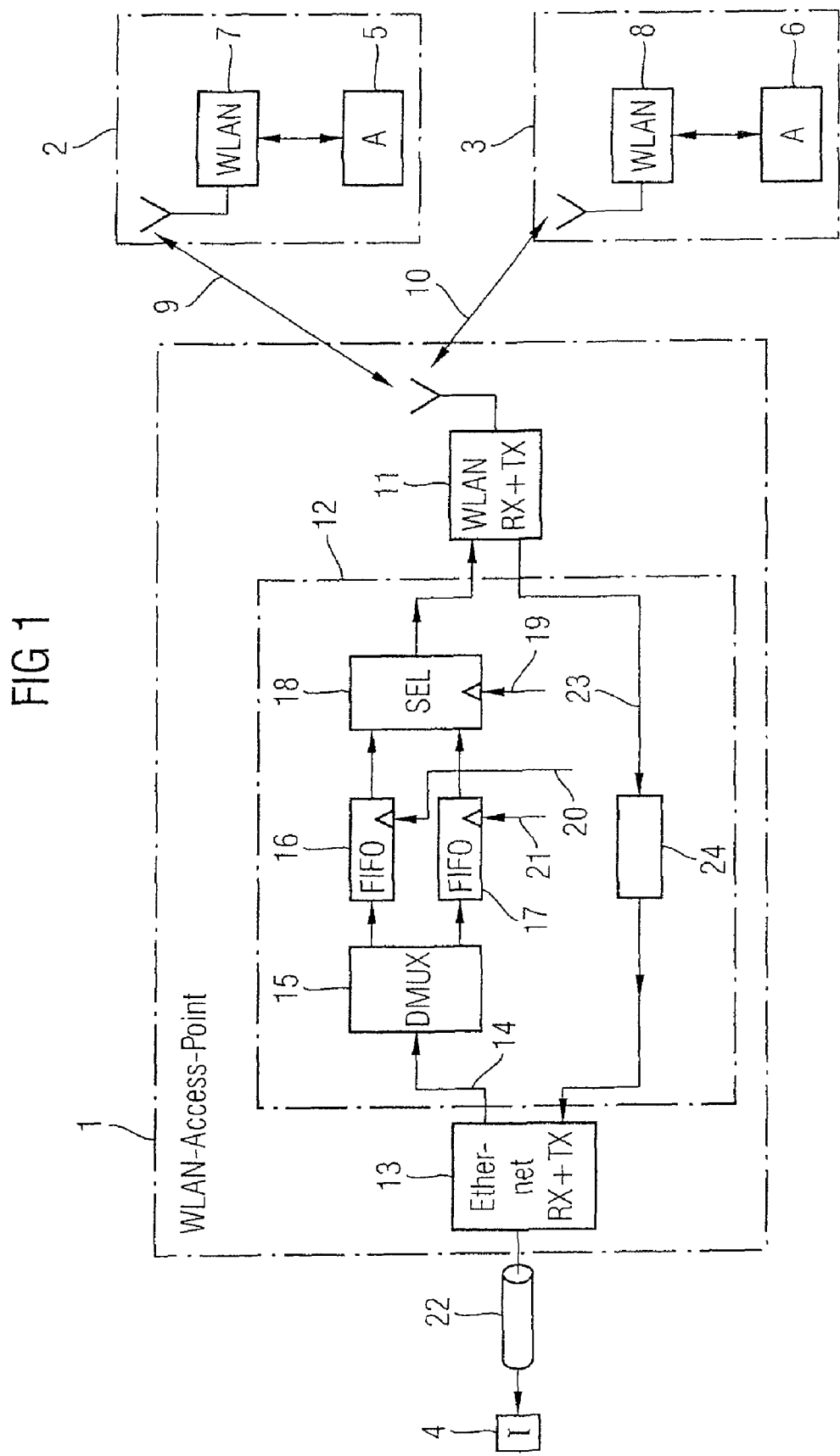
FIG. 1 shows a block diagram of the implementation of the method for a WLAN access point operating on the basis of the IEEE-802.11 Standard.

The method can be used to restrict the synchronous data traffic on a radio link. The synchronous data traffic may be based on various synchronous applications or services, for example purely speech-based VoIP or a video conference.

One field of application for the method is the avoidance of general or unauthorized transmission of a telephone call via the Internet. The method is in this case based on the knowledge that synchronous data traffic can be ensured only when the data rate of the WLAN radio link is kept continuously at a value which corresponds to the amount of data which is generated in a synchronous form per unit time. If this cannot be ensured, even if only briefly, the synchronous transmission of the data is adversely affected. If, the data is reduced even for only a short time period at randomly selected or fixed selected time intervals, this may result in a continuous adverse effect on synchronous data transmission. The quality of a VoIP link when using the method can be reduced so drastically that the user has to revert to the infrastructure of a cell-based mobile radio network in order to make a telephone call. The asynchronous data traffic, for example with conventional Internet applications such as surfing on the WWW or e-mail, may be, however, not adversely affected from the point of view of the user of the WLAN mobile station, since the average data rate of the WLAN radio link is only insignificantly reduced, or is not reduced at all, when using the method according to an embodiment, in comparison to data transmission without such a method. For the purposes of the application, the data rate may be reduced both unidirectionally and bidirectionally. In principle, for a bidirectional VoIP link, it can be sufficient to reduce only the data rate of the data received from the WLAN mobile station or the data transmitted to the WLAN mobile station, since the RTD is increased in both cases.

For the purpose of the application, the expressions WLAN base station or WLAN mobile station should be understood as meaning a network node in any desired wireless local area network, in particular a network node which is compatible with a standard (for example IEEE-802.11b) from the IEEE-802.11 Working Group. For simplicity, this class of standards is referred in the following text by the expression IEEE-802.11 Standard.

In this case, it can be advantageous for the method to be carried out in the WLAN base station. All that is therefore required is to implement the method according to an embodiment in the WLAN base station; there may be therefore no need to place any requirements resulting from the invention on the WLAN mobile station, in order to carry out the method. The method can thus be used for radio traffic with conventional WLAN mobile stations, without any modification to the WLAN mobile stations.

If the time duration and/or the time interval are/is varied in time, the time duration of the data rate reduction at any given time should advantageously in each case be shorter than the time interval at that time.

It can be advantageous for the repeated reduction in the data rate to be implemented in such a manner that the data on the radio link is delayed by a delay time at time intervals. In this case, the time delay effectively acts as a reduction, corresponding to the duration of the delay time, in the data rate at any given time to the value zero, since no data is transmitted during the period of the delay. The dynamic reduction in the data rate can be implemented with the aid of a repeated delay with particularly little complexity in this case, since all that is necessary is to interrupt the data traffic for the duration of the delay time. In particular, it may be possible to provide for the delay time to be selected randomly, so that no system can be identified in the adverse effect for the user to which the user could otherwise react.

In one embodiment, it may be advantageous for the repeated delay to be applied without intervention in the radio-specific OSI layers. For this purpose, the repeated delay to the data can be implemented in such a way that the further-processing of data which has been received from the landline network side and which is assigned to the radio link and thus to the WLAN mobile station is delayed in time intervals. In this case, the further-processing can be directed at that data which is temporarily stored in a buffer store which is located in the WLAN base station and is assigned to the radio link. The buffer store can be preferably a FIFO (first-in, first-out) memory. This can be provided as a FIFO queue in software, or in hardware, for example in the form of a FIFO ring memory.

Delaying data in this way can offer the advantage that the delay can be implemented without any intervention in the radio-specific layers, such as the MAC layer (Medium Access Control) or the physical layer. No changes are therefore required in the radio station, for example in the IEEE-802.11 Standard, to carry out the method. Since one and only one dedicated buffer store or buffer store area is available for each radio link between the WLAN base station and a WLAN mobile station, the procedure for the method according to an embodiment can be varied on a user-specific basis, in particular with the capability for the data delay also to be deactivated for specific users. If the buffer store is a FIFO memory, there is also no need to take any additional measures in order to ensure the integrity of the data flow despite the delays, since the FIFO principle (first-in, first-out) means that no data is lost, and there is no change to the data sequence. As has already been mentioned above, a buffer store such as this can be implemented on a software basis or on a hardware basis. The delay can be implemented, for example, by activating a switchable delay element downstream from the buffer store, at time intervals.

In order to delay the further-processing of this data, it may be advantageously possible in one embodiment to provide for the data output of the data which has been received on the landline network side from the buffer store, in particular the FIFO memory, to be suppressed at times, corresponding to the delay time.

In one embodiment, it may be very simple to implement a delay by suppression of the data output from the buffer store at times, without any additional delay elements. In particular, the data output can be suppressed by setting a signal, which controls the data output from the buffer store, during the suppression, such no new data can be read from the buffer store. Once the control signal has activated the reading process again after the delay time, the data which is read from the buffer store is that which was already waiting to be output at the time at which the data output was suppressed.

In one embodiment, it may be advantageous for the time duration on the delay time to be in the range from 100 ms to 5 s, in particular in the range from 100 ms to 1 s. This choice of the time period or the delay time does not impede the asynchronous data traffic from the point of view of the user of the WLAN mobile station. However, the synchronous data traffic is so severely adversely affected that it is no longer possible to carry out VoIP in a worthwhile manner, because of the increased RTD associated with this. The time interval should advantageously be in the range from 500 ms to 15 s, in particular in the range from 1 s to 10 s.

According to one embodiment of the method, the user status of the WLAN mobile station can be checked first of all. The data rate on the radio link can then be reduced only when the user status does not authorize use of a synchronous data service, for example VoIP. If the user status authorizes use of the synchronous data service, the repeated reduction in the data rate is deactivated.

In one embodiment, the selective activation or deactivation of the data-rate reduction as a function of the user status can make it possible to provide the necessary QoS for use of a synchronous service, for example VoIP, exclusively to authorized users of a WLAN mobile station. The authorization can in this case be linked to payment of a specific fee. Those users who are not authorized for use on the basis of the user status are in practice prevented from using the synchronous service, by the reduction in the data rate.

The apparatus according to one embodiment can be designed to control the data flow on a radio link between a WLAN base station and a WLAN mobile station. The apparatus has means to reduce the data rate at time intervals.

The WLAN station according to an embodiment may comprise the apparatus. The WLAN station may be a WLAN base station or a WLAN mobile station. The apparatus is preferably integrated in the WLAN base station.

FIG. 1 shows the implementation of the method for a WLAN access point 1 operating on the basis of the IEEE-802.11 Standard. The WLAN access point 1 represents an access point to the Internet 4 for WLAN mobile stations 2 and 3 which are within radio range. In this case, the WLAN access point 1 together with the WLAN mobile stations 2 and 3 forms a radio network. One WLAN mobile station 2 or 3 may in this case, by way of example, be in the form of a laptop, PDA (Personal Data Assistant) or even a conventional GSM or UMTS mobile telephone with an IEEE-802.11-compatible radio interface. In this case, the applications 5 and 6 are carried out, respectively, in the WLAN mobile stations 2 and 3, with data interchange with the Internet 4 being required for both applications 5 and 6. An application 5 or 6 such as this may, for example, be in the form of VoIP or surfing on the WWW. The data interchange for the applications 5 and 6 in this case takes place via the respective WLAN transceivers 7 and 8 which are located in the respective WLAN mobile stations 2 and 3 and are each connected to the WLAN access point 1, in particular to a WLAN transceiver 11 which is located in the WLAN access point 1, via a respective radio link 9 or 10. The data associated with the radio links 9 and 10 is supplied to an Ethernet transceiver 13 (separated on the basis of the reception or transmission direction) via a WLAN/Ethernet interface 12 which will be described in more detail in the following text, and is output from the Ethernet transceiver 13 to the WLAN transceiver 11.

By way of example, the Ethernet transceiver 13 operates on the basis of the 10BaseT—(10 Mbit/s), the 100BaseT—(100 Mbit/s, also referred to as Fast Ethernet) or the 100Base-Standard (1 Gbit/s, also referred to as Gigabit Ethernet). The Ethernet transceiver 13 has access to the Internet 4 via a transmission medium 22 (for example glass-fiber or coaxial lines). The WLAN access point 1 assigns data packets 14 received by the Ethernet transceiver 13 to parallel FIFO memories 16 and 17, for temporary storage, via a demultiplexer 15. The demultiplexer 15 carries out this assignment process as a function of the destination address, that is to say the address of the WLAN mobile station 2 or the address of the WLAN mobile station 3, of the respective data packet 14. Each FIFO memory 16 and 17 is in this case associated with one of the WLAN mobile stations 2 or 3. In the present case, it is assumed that the FIFO memory 16 is associated with the mobile station 2, and the FIFO memory 17 is associated with the mobile station 3. The data located in the FIFO memories 16 and 17 is read via a selector 18, which is also referred to as an arbiter, and is then sent from the WLAN transceiver 11 to the WLAN mobile station 2 or 3. The control signal 19 for the selector 18 is defined as part of the MAC layer by the access process on which this is based (for example distributed coordination function—DCF, point coordination function—PCF). The data output from the FIFO memories 16 and 17 is controlled by the respective control signals 20 and 21. In the WLAN access point 1, data packets 23 received via the WLAN transceiver 11 are written to the Ethernet transceiver 13 via a network 24, which is not specified in any more detail for the purposes of the application. The WLAN/Ethernet interface 12 may be in the form of hardware, software or may be in a mixed form. The control signals 20 and 21 may thus also be software-internal variables.

The following text is first of all based on the assumption that the application 5 in the WLAN mobile station 2 does not produce any synchronous data traffic (for example surfing on the WWW). In contrast to this, the application 6 in the WLAN mobile station 3 represents Internet telephony, in which case synchronous data must be interchanged bidirectionally and continuously between the WLAN mobile station 3 and the corresponding call partner. When the radio link 9 or 10 is being set out, the WLAN access point 1 checks the user status of the WLAN mobile stations 2 and 3. This information can be checked, for example, via the Internet from a service provider database. The data rate on the radio link 9 or 10 is then reduced briefly at time intervals only when the user status does not authorize use of a synchronous data service, for example Internet telephony. If this is the case, the data on the radio link 9 or 10 is delayed by a delay time, for example of 200 ms, at time intervals, for example of 1 s. According to the exemplary embodiment, the delay relates to the further-processing of the data which has been received via the Ethernet transceiver 13 and has been stored in the FIFO memories 16 and 17.

On the basis of FIG. 1, the delay is implemented in such a way that the data output from the FIFO memory 16 or 17 is suppressed briefly at time intervals. One advantage of this procedure is that there is no need to intervene in the MAC layer or in the physical layer of the WLAN interface. In detail, the delay is produced by setting the respective control signal 20 or 21 during the delay time such that the selector 18 cannot read any data from the respective FIFO memory 16 or 17 during the delay time, even though the selector 18 is ready to read data from the respective buffer store 16 or 17 in accordance with the access method (as part of the MAC layer). Once the delay time has passed, the respective control signal 20 or 21 is set such that the data can be read by the selector 18 from the respective FIFO memory 16 or 17. The data which the selector 18 should actually have read at the start of the delay is thus now read later, after the delay time. This means that the data is also received later in the respective mobile station 2 or 3. The application 5 is not adversely affected by the brief delay occurring at time intervals, since the average data rate of the WLAN radio link 9 when the method according to an embodiment is being used is reduced only insignificantly, or is not reduced at all, in comparison to data transmission without such a method. The increase in the RTD which occurs as a result of this (for example of 200 ms at time intervals of 1 s) is undetectable by the user of the WLAN mobile station 2. In contrast, the quality of the VoIP link in the form of the application 6 is drastically reduced by the increase in the RTD for the user of the WLAN mobile station 3. The user of the WLAN mobile station 3 has to revert to his GSM or UMTS mobile station for mobile speech communication.

For another operating situation for the WLAN access point 1, it is now assumed that both the application 5 in the WLAN mobile station 2 and the application 6 in the WLAN mobile station 3 represent Internet telephony. While the radio link 9 or 10 is being set up, the WLAN access point 1 checks the user status of the WLAN mobile stations 2 and 3. In this case, it is found that only the user (premium user) of the WLAN mobile station 2 is authorized for Internet telephony, while in contrast the user (standard user) of the WLAN mobile station 3 does not have this authorization. Data packets which have been received in the Ethernet transceiver 13 and are intended for the mobile station 2 are written to the FIFO memory 16 via the demultiplexer 15, while in contrast those data packets which are intended for the mobile station 3 are written to the FIFO memory 17. The delayed output and passing on of the data as described above is in this case implemented only for the FIFO memory 17. For this purpose, as already described, the control signal 21 must be set such that the selector 18 cannot read any data from the FIFO memory 17 during the delay time. No delay is provided for the data output from the FIFO memory 16. The RTD is thus increased only for the mobile station 3, while in contrast the RTD is not increased for the mobile station 2. The quality of the VoIP link in the form of the application 6 is thus drastically reduced by the increase in the RTD while in contrast, the VoIP link in the form of the application 5 is not subject to any restriction.

For the purposes of the application, it is alternatively or else additionally feasible for the data sent from the mobile stations 2 and 3 to be delayed in an analogous manner to the received data. In this case, the network 24 must be designed in an analogous manner to the technical teaching described above.

Figure 2:
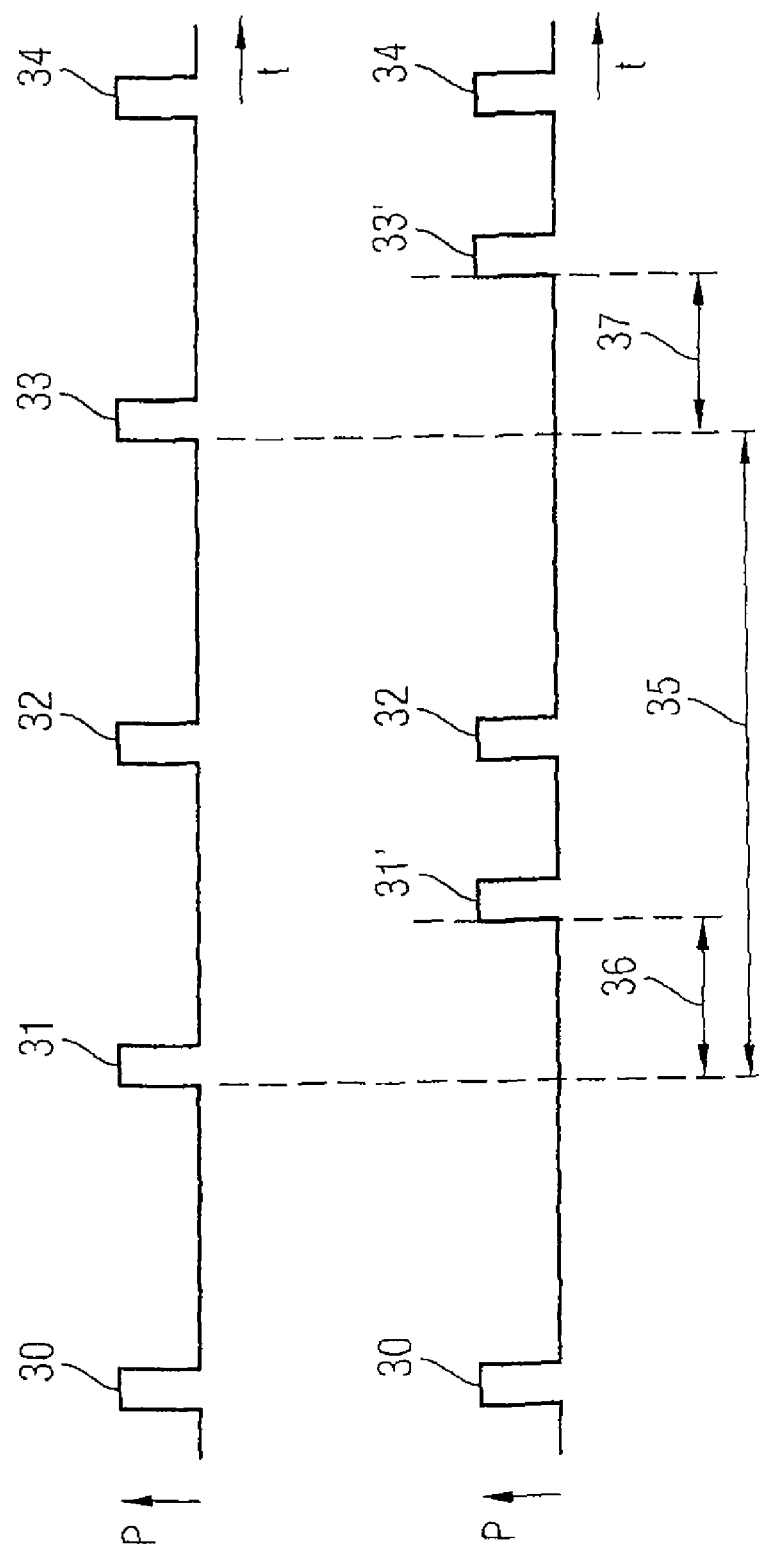
FIG. 2 shows two time profiles of a radio link with and without a brief delay in the transmission.

FIG. 2 shows two power/time profiles for the radio link 9 or 10 based on FIG. 1, in which the time profiles relate to the data received at a WLAN mobile station 2 or 3. The illustration of the time profiles is intended only to assist understanding of the principle of the invention, and is not true to scale in terms of the actual relationships. The time delay may in this case be several orders of magnitude greater than the length of one time slot (20 μs in the case of the 802.11b Standard with a data transmission rate of 11 Mbit/s), and the maximum length of an MAC frame (a maximum of 4095 bytes for the 802.11b Standard, with a data transmission rate of 11 Mbit/s). The upper time profile describes a radio link 9 or 10 for which the data delay according to an embodiment on the radio link 9 or 10 by a delay time at time intervals is not implemented. Individual data bursts 30 to 34 are in each case transmitted without any delay. In contrast, the lower time profile shows a radio link 9 or 10 for which individual data bursts 31' and 33' are delayed by a respective delay time 36 or 37 at time intervals 35. In this case, data bursts which are provided with the same reference symbols from the upper time profile and the lower time profile correspond to one another. The data burst 31' from the lower time profile is in this case delayed by the delay time 36 in comparison to the data burst 31 from the upper time profile. The data burst 33' from the lower time profile is delayed analogously by the time profile 37 with respect to the data burst 33 from the upper time profile. During the delay times 36 and 37, the data rate briefly falls to zero. The delay times 36 and 37 may correspond to one another. According to an embodiment, the data is briefly delayed at time intervals 35 in such a way that only the data bursts 31' and 33' are delayed in time, but not all of the data bursts.

What is claimed is:

1. A method for controlling the data flow in a radio link between a wireless local area network (WLAN) base station and a WLAN mobile station with the radio link having synchronous data traffic and asynchronous data traffic, comprising:
    a) providing that the synchronous data traffic requires that delay times on the channel remain below a certain delay time threshold, and
    b) reducing the data rate of the synchronous data traffic on the radio link for a time period at time intervals, in order to restrict the synchronous data traffic, wherein the reducing comprises deliberately delaying the data on the radio link by a delay time greater than the certain delay time threshold.

2. The method according to claim 1, wherein the method is carried out at the WLAN base station.

3. The method according to claim 1, wherein the time period of the data rate reduction at any given time is in each case shorter than the time interval at that time.

4. The method according to claim 1, wherein a) comprises:
    a') delay of the data on the radio link by a delay time, in particular a randomly selected delay time, at time intervals.

5. The method according to claim 4, wherein a') comprises:
    a") delay of the further-processing of data which is received at the landline network end, is assigned to the radio link and is temporarily stored in a buffer store, in particular a first-in first-out (FIFO) memory, which is located in the WLAN base station and is assigned to the radio link.

6. The method according to claim 5, wherein a") comprises:
    suppression of the data output of the data which has been received at the landline end from the buffer store, in particular the FIFO memory, at times, corresponding to the delay time.

7. The method of claim 5, wherein the delay is added even if the WLAN base station is ready to transmit the data from the FIFO memory.

8. The method according to claim 1, wherein the time period or the delay time is in the range from 100 ms to 5 s.

9. The method according to claim 8, wherein the time interval is in the range from 500 ms to 15 s.

10. The method according to claim 1, wherein the time period or the delay time and/or the time interval vary in time.

11. The method according to claim 1, comprising:
    b) checking of a user status of the WLAN mobile station with the result of the check from b) governing whether a) is carried out.

12. The method according to claim 1, wherein the synchronous data traffic is voice over internet protocol (VoIP) traffic.

13. An apparatus for controlling the data flow on a radio link between a wireless local area network (WLAN) base station and a WLAN mobile station, with the radio link having synchronous data traffic and asynchronous data traffic, the apparatus comprising:
    means for providing that the synchronous data traffic requires that delay times on the channel remain below a certain delay time threshold, and
    means for reducing the data rate of the synchronous data traffic for in each case one time period at time intervals, in order to restrict the synchronous data traffic, wherein the means for reducing includes means for deliberately delaying the data on the radio link by a delay time greater than the certain delay time threshold.

14. The apparatus according to claim 13, wherein the means for reducing the data rate has a buffer store, in particular a first-in first-out (FIFO) memory, for temporary storage of received data or of data to be transmitted, and has a control signal, which is associated with the buffer store, for suppression of the data outputs from the buffer store at times.

15. The WLAN station, in particular a WLAN base station, having an apparatus according to claim 13.

* * * * *